June 28, 1949.  S. R. HOWARD  2,474,250
POWER-DRIVEN MECHANISM AND PORTABLE DEMOUNTABLE
SUPPORTING STANDARD THEREFOR
Filed July 27, 1944  12 Sheets-Sheet 1
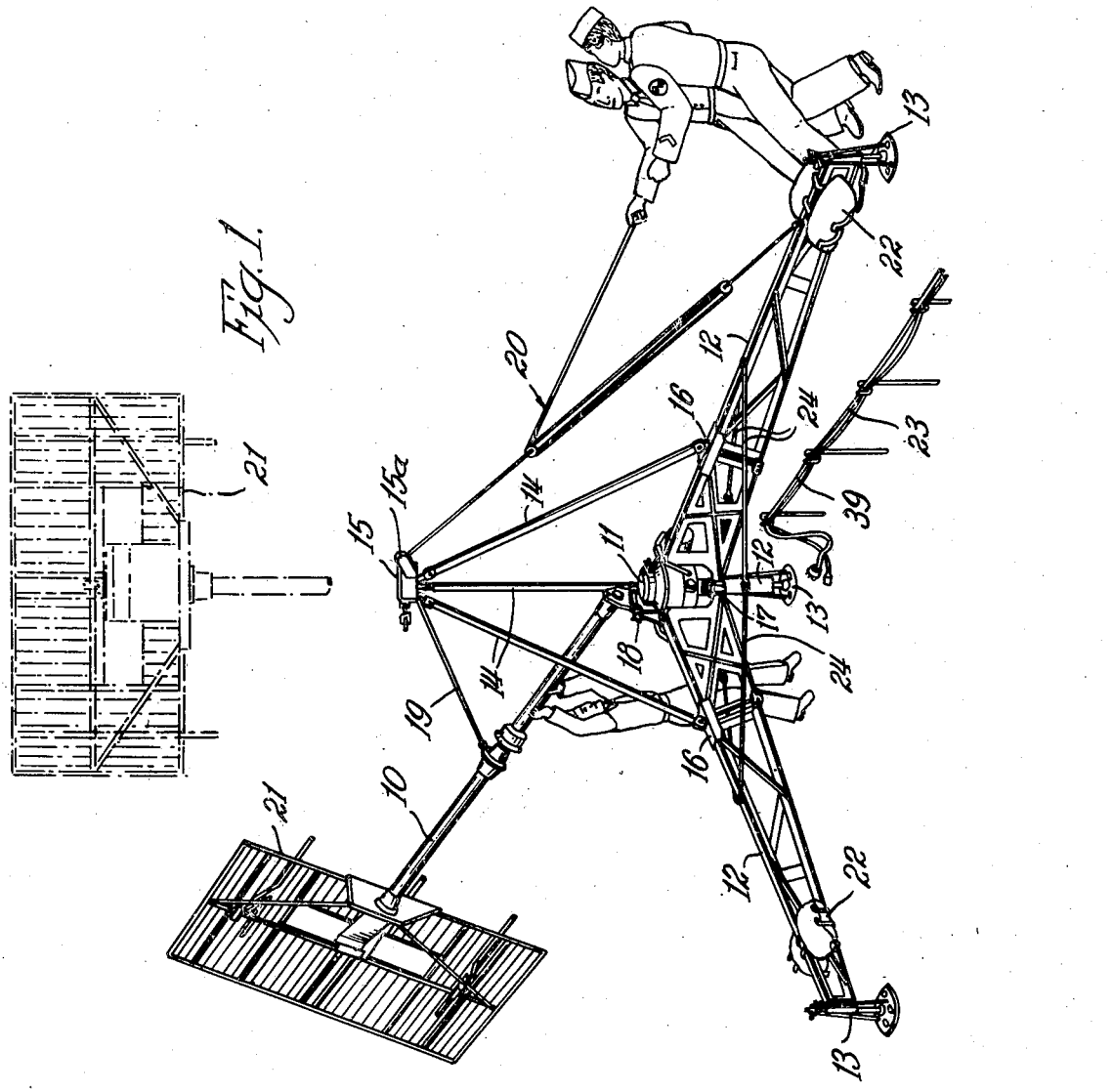
INVENTOR.
Stanley R. Howard
BY Mueller, Dodds & Mason
Att'ys

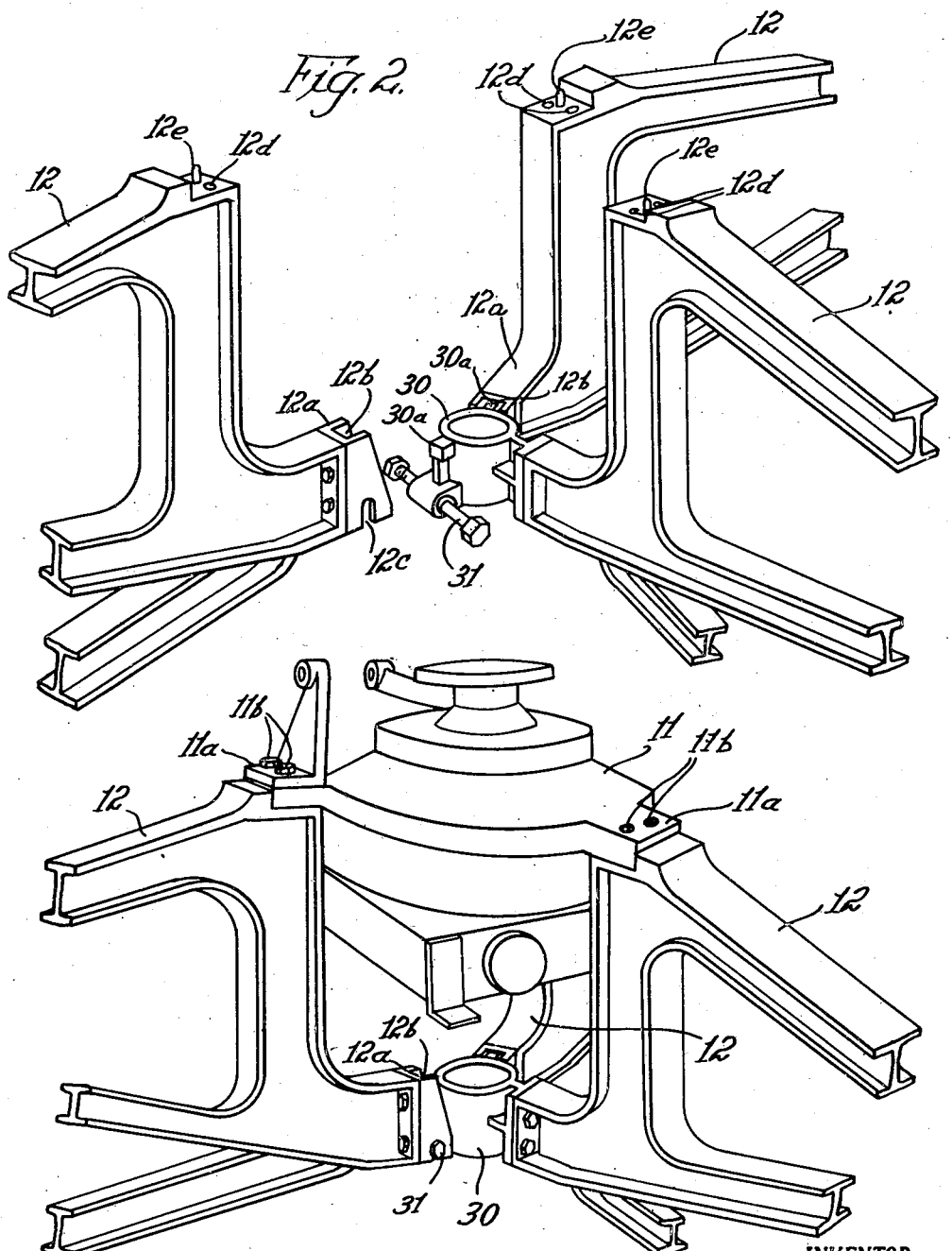

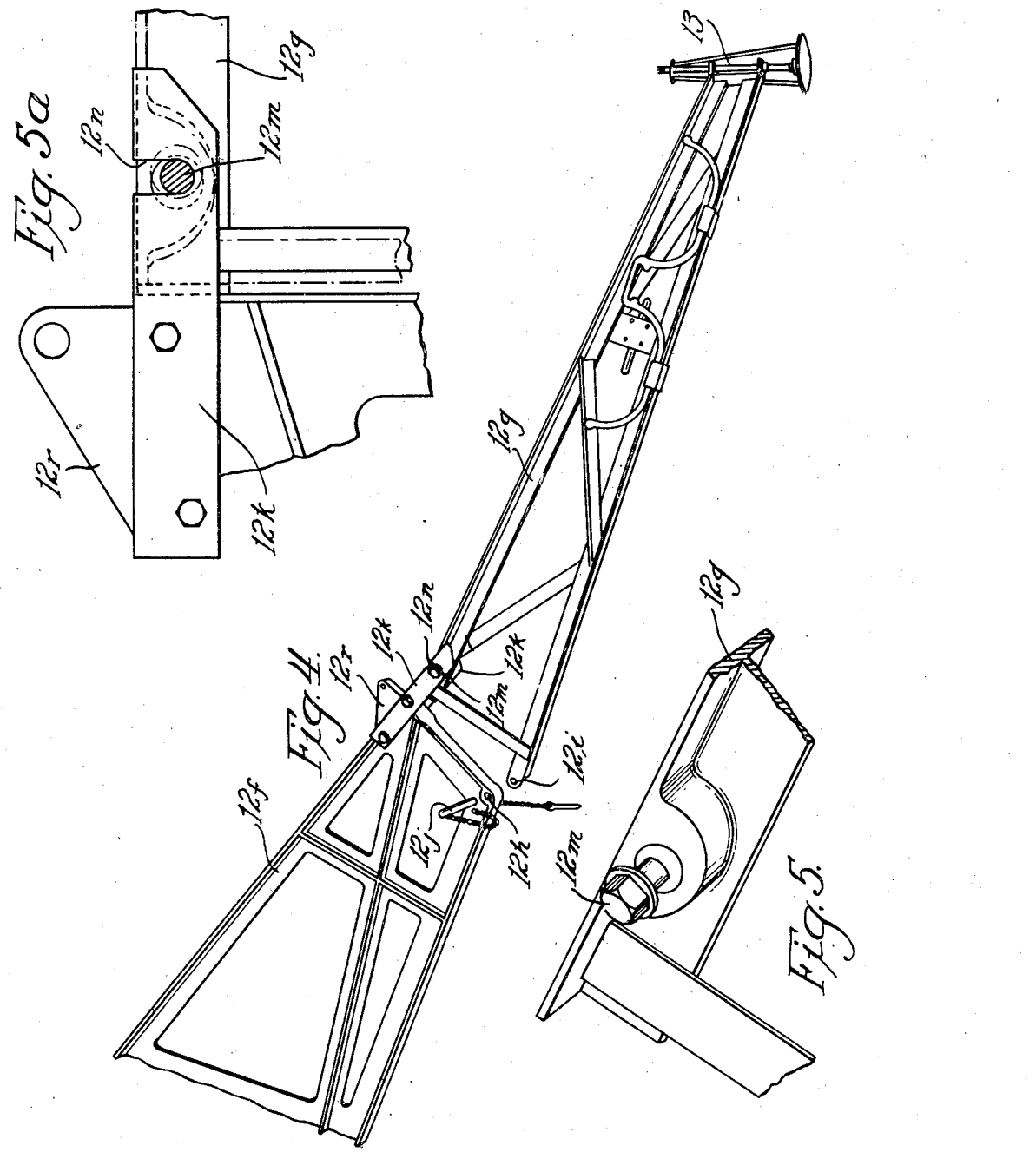

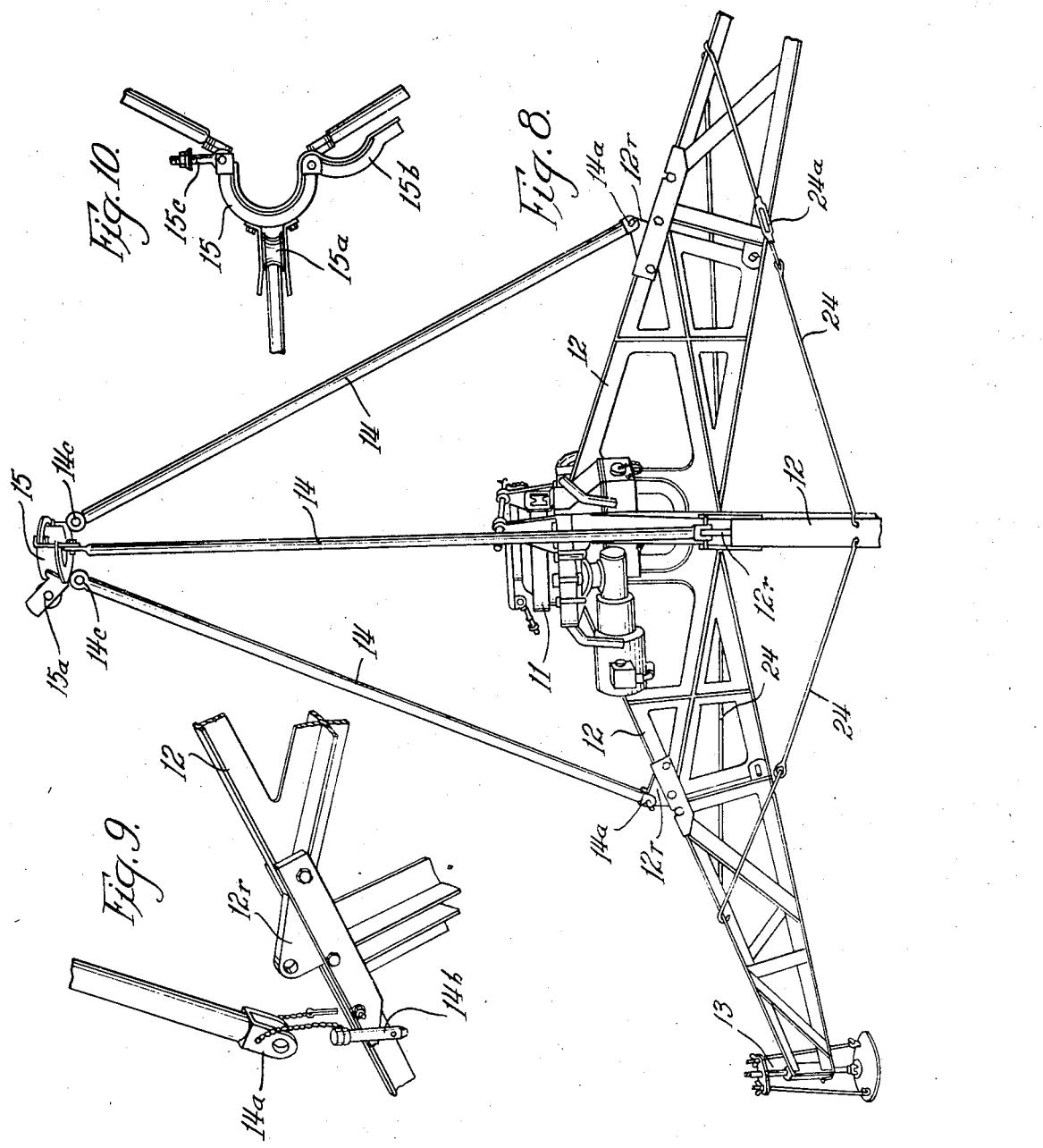

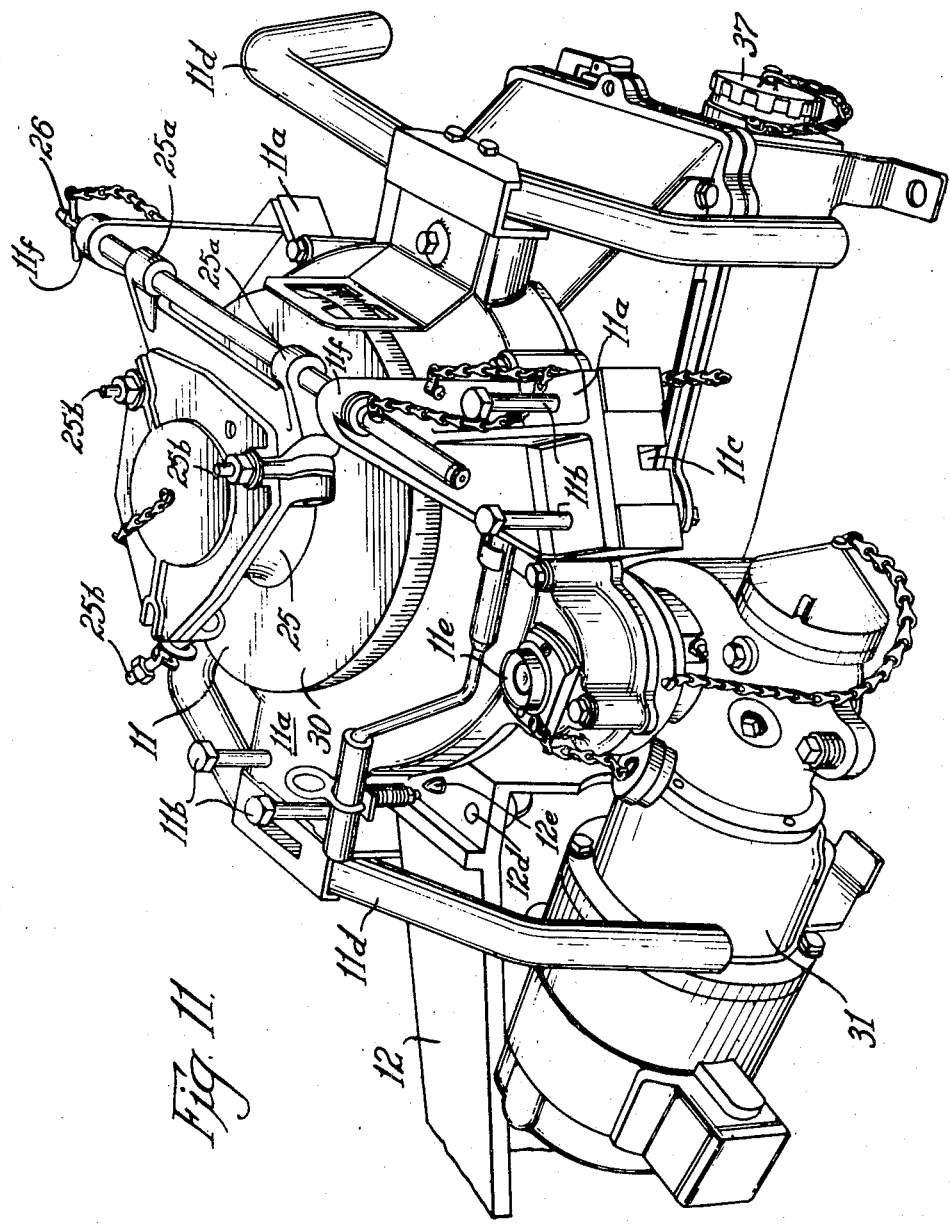

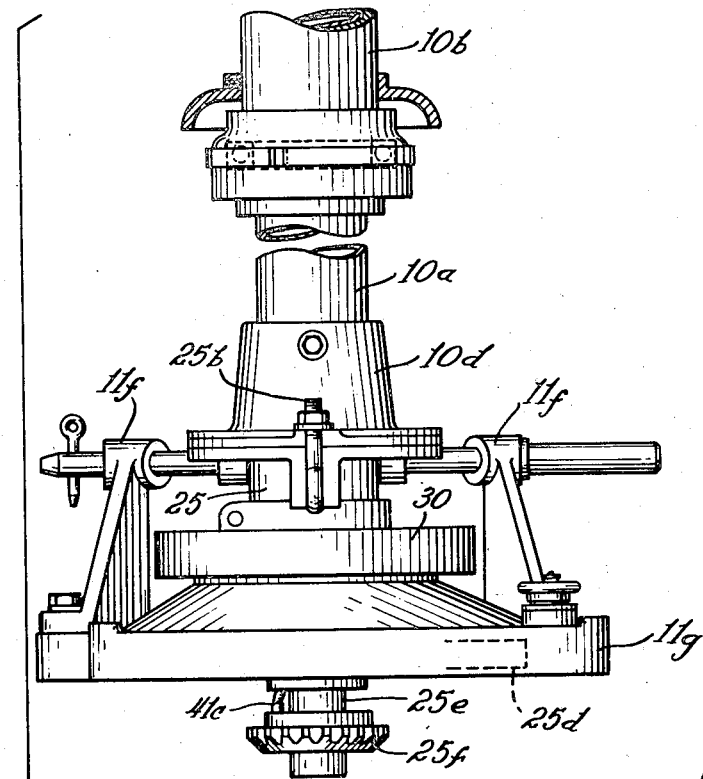
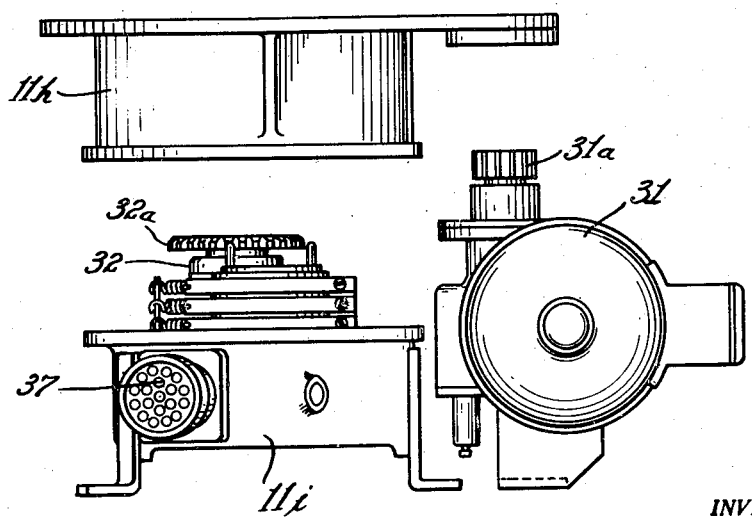
Fig. 14
INVENTOR.
Stanley R. Howard

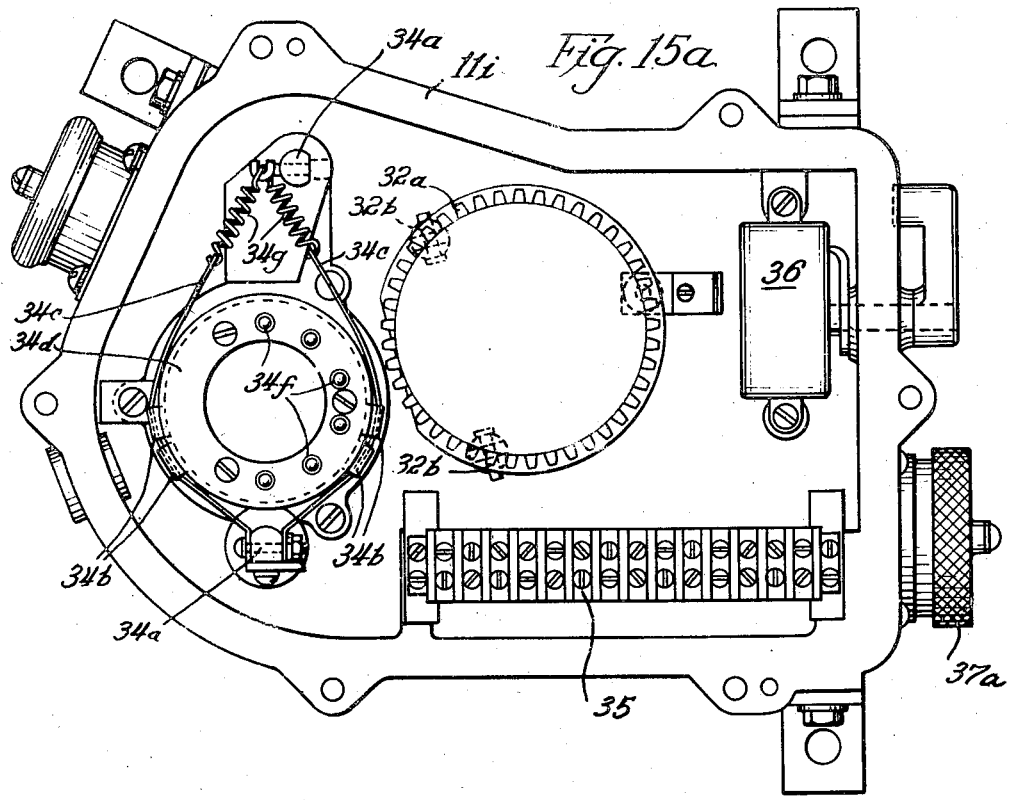
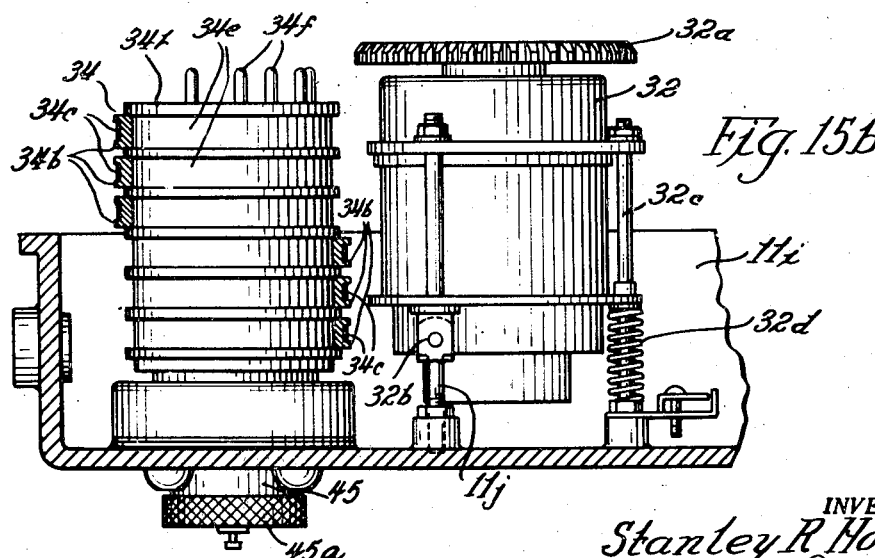

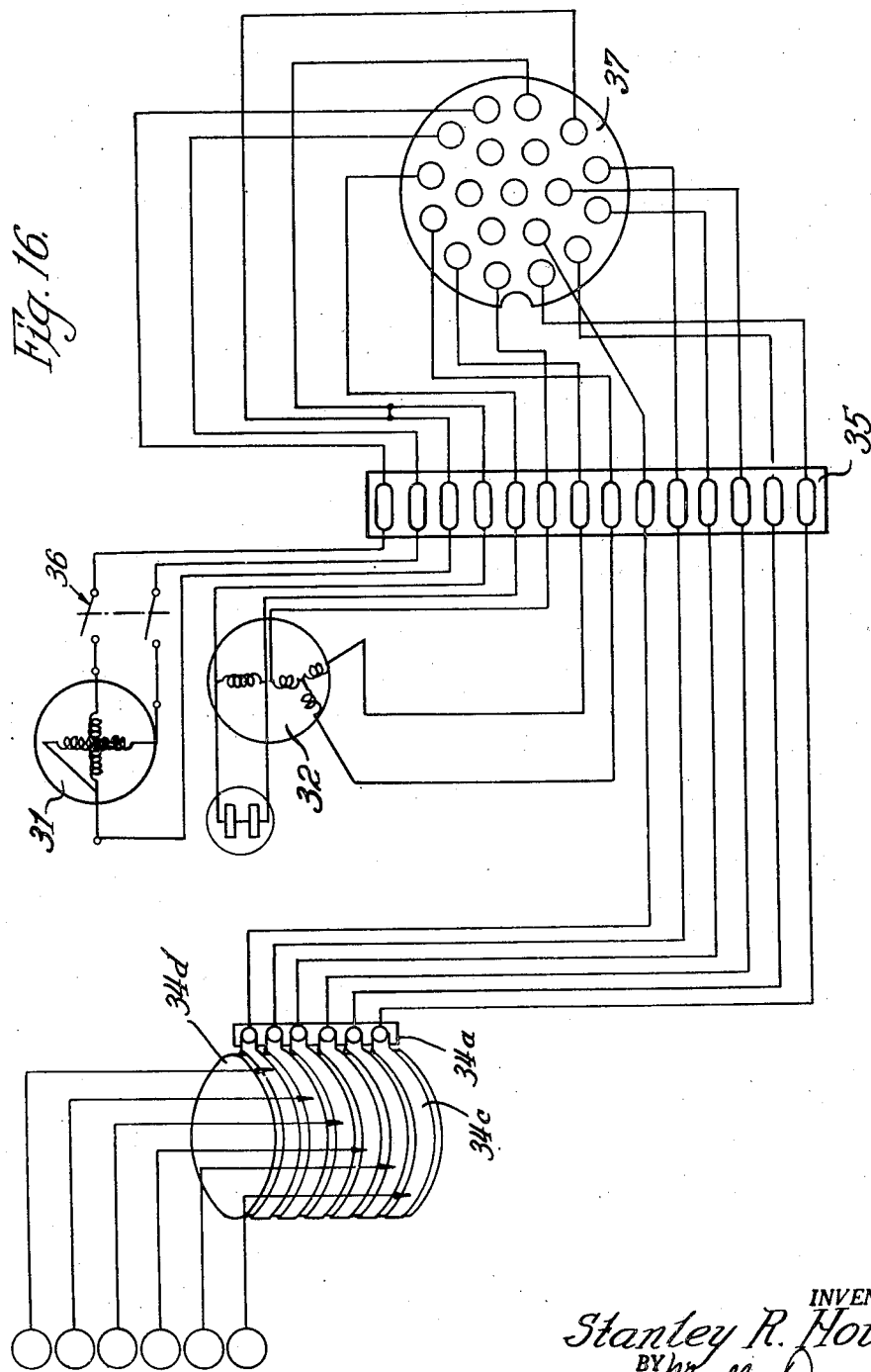

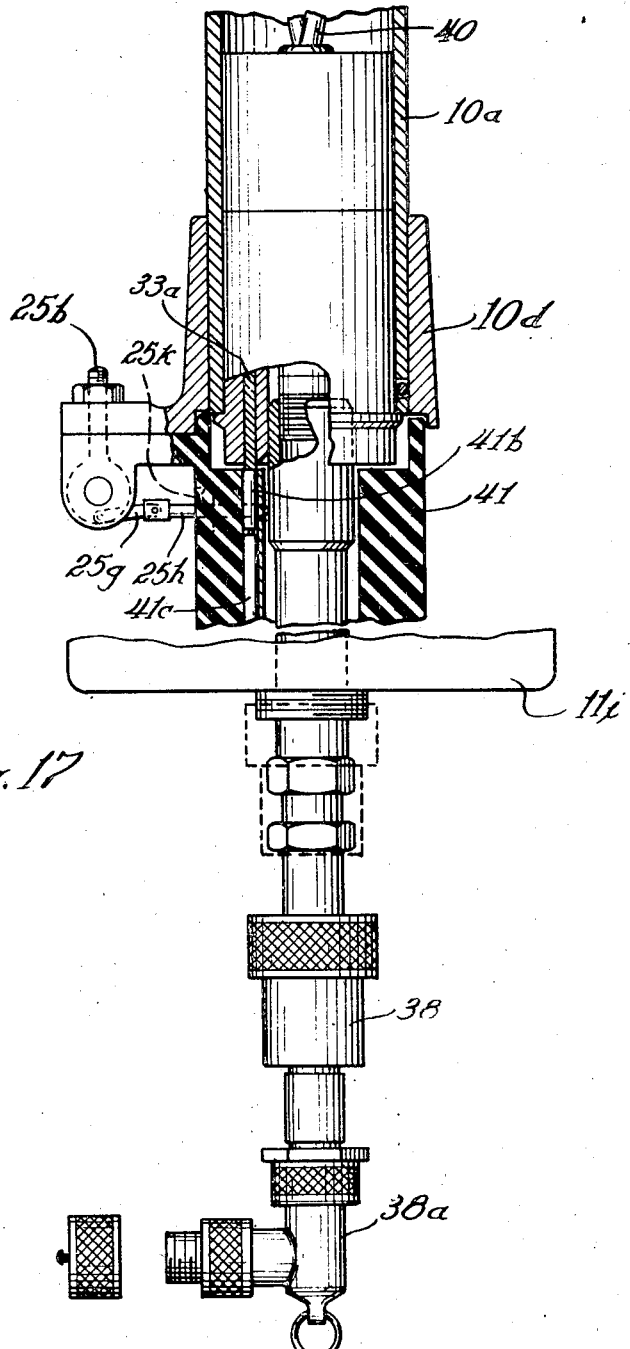

Patented June 28, 1949

2,474,250

UNITED STATES PATENT OFFICE 2,474,250

POWER-DRIVEN MECHANISM AND PORTABLE DEMOUNTABLE SUPPORTING STANDARD THEREFOR

Stanley R. Howard, North Quincy, Mass., assignor, by mesne assignments, to Belmont Radio Corporation, Chicago, Ill., a corporation of Illinois Application July 27, 1944, Serial No. 546,858

21 Claims. (Cl. 248—1)

This invention relates to a power-driven mechanism including an extended rotatable vertical shaft and a portable demountable supporting standard therefor and, while it is of general application, it is particularly adapted for use as a driving mechanism and supporting standard for a rotatable directional antenna array and will be illustrated and described in such an embodiment.

There is a considerable need for portable demountable power driven mechanisms and for portable demounting supporting standards therefor which can be assembled and disassembled quickly for movement from place to place. It is desirable that the mechanism and its associated standard should be compact when disassembled, to facilitate shipping, and that it should be mechanically as simple as possible consistent with performance requirements, so that it can be assembled and disassembled by relatively unskilled labor and with the use of a minimum number of special tools and assembly jigs. At the same time, it is important that the mechanism and its standard be of rigid construction when assembled and have a precision of performance, both of its cooperating elements and of the assembly as a whole, consistent with the requirements for the particular installation.

For example, when the invention is applied to a rotatable directional antenna array, it is of utmost importance that the rotation of the antenna be subject continuously to a most precise control, either at the base of the mechanism or from a remote point. Also, it is important that the mechanism and its standard, when assembled, be rugged and capable of withstanding the heavy wind loading of the elevated and exposed antenna. Further, it is important that, when the apparatus is disassembled, it be compact to enable it to be packed in a truck for movement to a new location, particularly when the apparatus is utilized for military purposes. Similarly, when the invention is applied to a portable crane or derrick, characteristics of primary importance are simplicity in the assembling and disassembling operations, ruggedness of the assembled apparatus, and compactness when disassembled for shipment.

It is an object of the invention, therefore, to provide a new and improved power-driven mechanism and a portable demountable supporting standard therefor embodying one or more of the following advantageous characteristics; simplicity of assembly and disassembly; compactness in disassembly; ruggedness; and accuracy in performance of the apparatus as a whole when assembled.

In accordance with the invention, a portable demountable supporting standard for a mechanism including an extended vertical shaft comprises a plurality of radially extending supporting arms and junction means for detachably securing the arms together at their inner ends. The standard also includes a plurality of upwardly extending braces detachably individually secured to points on the arms remote from their inner ends and junction means for securing the braces together at their upper ends and comprising a bearing for the vertical shaft.

Further, in accordance with the invention, in a portable demountable supporting standard including a plurality of radially extending supporting arms, each including at its outer end a plurality of vertically spaced supporting elements, which standard may be of conventional construction but is preferably of the type described in the preceding paragraph, there is provided an adjustable pedestal for each of the arms comprising a base member of substantial supporting area, an upwardly extending threaded supporting shaft rotatably supported from the member, and a cradle threaded on the shaft and including vertically spaced supports positioned to engage the supporting elements of the supporting arms. The upwardly extending shaft is pivotally mounted on the base member to permit alignment of the supports of the cradle and the supporting elements of the arm.

Further in accordance with the invention, in a portable demountable supporting standard including a plurality of detachable structural members, such standard being either of conventional construction or preferably of the type described above, there is provided an adjustable joint for a pair of the detachable members comprising complementary engaging elements for the members sufficiently loose-fitting to facilitate ready engagement of the members in assembly. The joint also includes camming means pivotally mounted on one of the members and a complementary aperture formed in the other of the members adapted to engage the camming means, pivotal adjustment of the camming means being effective to position the members accurately relative to each other.

Further in accordance with the invention, in a portable demountable supporting standard for a mechanism including a vertical rotatable shaft, which standard may be of standard construction but preferably is of the type described above, there is provided a fulcrum joint comprising a member adapted to be supported from the standard and including means for rotating the shaft. The joint also includes a member secured to the shaft, complementary hinge elements formed on the members, a removable hinge pin for the elements serving as a fulcrum about which the shaft may be swung from a horizontal position to a vertical position, and means independent of the hinge elements for securing the members together with said shaft in a vertical position.

Further in accordance with the invention, in a portable demountable supporting standard for a mechanism including an extended vertical rotating shaft and a plurality of radially extending supporting arms forming a cradle between their inner ends, which standard may be of conventional construction but is preferably of the type described above, there is provided a preassembled portable driving and shaft-supporting unit comprising a casing proportioned to fit within the cradle and having supporting provisions adapted detachably to engage the arms. A support for the shaft is disposed in and projects from the top of the casing and is rotatable about a vertical axis and the unit includes also a driving motor connected to rotate the support.

Further in accordance with the invention, a power driven mechanism comprises a combination of one or more of the features described in the preceding paragraphs or of subsidiary features thereof.

Also in accordance with the invention, a portable demountable supporting standard comprises a combination of one or more of the features described in the preceding paragraphs or of subsidiary features thereof.

For a better understanding of the invention, together with other and further objects thereof, reference is had to the following description taken in connection with the accompanying drawings while its scope will be pointed out in the appended claims.

Referring now to the drawings:

Fig. 1 is a perspective view of a complete power-driven mechanism and a portable demountable supporting standard therefor as it appears in the final step of the assembly operation;

Figs. 2 and 3 are perspective views illustrating the assembly of the inner sections of the arms of the standard;

Fig. 4 is a perspective view of the assembly of a joint between the inner and outer sections of an arm of the standard;

Fig. 5 is a detailed perspective view of a camming pin embodied in the joint of Fig. 4, while Fig. 5a is a detailed elevation of the assembled joint of Fig. 4;

Fig. 6 is a perspective view of a pedestal support for each of the arms of the standard, while

Fig. 8 is a side view of the assembly of the standard arm, the pedestal, the driving unit and braces;

Fig. 9 is a detail of a junction between the braces and arms of Fig. 8;

Fig. 10 is a detail of a collar for securing together the top ends of the braces;

Fig. 11 is a perspective view of the driving unit per se;

Fig. 14 is an exploded elevation of the driving unit and mast assembly;

Figs. 15a and 15b are top and fragmentary side views, respectively, of the internal arrangement of components of the driving unit of Fig. 11;

Fig. 16 is a simplified circuit diagram of the control circuit and connectors of the driving unit; while Fig. 17 is a detailed view, partially in cross-section, of an assembly of the external coaxial cable for completing the circuit connections to the antenna.

Figure 6:
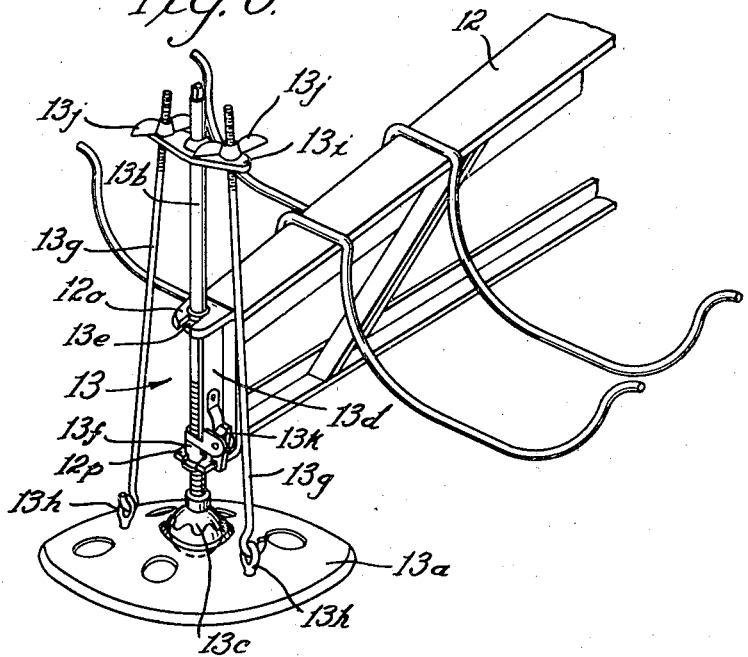

Referring now to Fig. 1 of the drawing, there is represented pictorially a complete portable demountable mechanism and a portable demountable supporting standard therefor. To aid in the understanding of the detailed description of the component features of the apparatus only a general reference to the principal features will initially be made with reference to Fig. 1, while a detailed description will follow with reference to the succeeding figures. The apparatus of Fig. 1 comprises essentially an extended hollow vertical rotatable shaft 10 shown in the process of being hoisted to its vertical position, illustrated in dotted-line outline. The shaft 10 is supported and driven by a portable demountable unitary driving or operating mechanism 11 which, in turn, is supported from a portable demountable standard comprising a plurality, preferably three, of radially extending supporting arms 12 which in practice may be substantially identical. At the outer end of each of the arms 12, there is provided an adjustable pedestal or jack 13 by means of which the supporting standard may be leveled. There are also provided a plurality of upwardly extending braces 14 detachably secured to points on the arms 12 remote from their inner ends and there are provided junction means such as a collar 15 for securing the braces 14 together at the upper ends, the collar 14 and the braces 14 constituting a tripod assembly. The collar 15 includes a split bearing for receiving and supporting the vertical shaft 10.

One of the features of the demountable supporting standard is an adjustable joint for associated detachable members of the apparatus, such as the joints 16 between the inner and outer sections of the supporting arms 12 and the joints 17 between the supporting arms 12 and the unitary operating mechanism 11.

Another feature of the invention is the fulcrum joint 18 between the vertical mast 10 and the operating mechanism 11, which is a temporary joint facilitating the erection of the mast 10 from the horizontal position to the vertical position. This erection is effected by means of a cable 19 running from a midpoint of the shaft 10 over a pulley 15a attached to the collar 15 and to a block and tackle 20 attached near the end of one of the arms 12. With this arrangement, the shaft 10 may be readily erected to the vertical position in spite of apparatus of considerable weight disposed at its upper end.

While the portable demountable mechanism and the portable demountable standard thereof of Fig. 1 is of general application to mechanism embodying an extended vertical rotatable shaft, the invention is illustrated in Fig. 1 as applied to a mechanism and standard for driving and supporting, respectively, a directional antenna array 21; however, the antenna per se forms no part of the present invention.

In operation, the apparatus of Fig. 1, after assembly as described in detail hereinafter, may be leveled by means of the adjustable pedestals 13 and may be stabilized by applying sandbags or other suitable weights to hangers 22 attached near the outer ends of the supporting arms 12. Electrical connections for apparatus within the unitary operating mechanism 11 or for electrical apparatus, such as the antenna 21, disposed at the upper end of the shaft 10 may be made by way of suitable cables 23, 39 which make connection at the base of the operating mechanism 11, certain of the connections passing up through a rotary connector therein, through the shaft 10, and to the electrical apparatus, such as the antenna 21, at the upper end of the shaft.

In view of the complexity of certain of the components of the demountable mechanism and supporting standard illustrated, it is believed that an understanding of the invention can best be had by reference to a detailed description of the assembly process of the several components.

Referring now to Figs. 2 and 3 of the drawings, there are represented the steps of assembling the three radially extending supporting arms 12 at their inner ends. To this end, there is provided a junction means for detachably securing the arms together at their inner ends; for example, an anchor 30 permanently attached to the inner end of one of the arms 12 by bolts, rivets, or the like and including provisions for detachably engaging the inner ends of the other arms. The detachable engaging provisions for the anchor 30 and the other arms 12 comprise complementary engaging elements for the members which are sufficiently loose-fitting to facilitate their ready engagement in assembly, together with camming means pivotally mounted on one of the members and a complementary aperture formed in the other and adapted to engage the camming means, pivotal adjustment of the camming means being effective to position the members accurately relative to each other. Specifically, the complementary engaging elements comprise the radially extending lugs 30a on anchor 30 and complementary aligning slots 12b formed in extensions 12a of two of the arms 12. The camming means comprises a pair of pins 31 eccentrically mounted in the anchor member 30 substantially normal to the radially projecting lugs 30a, while complementary apertures or slots 12c are formed in the lower faces of the projections 12a. In assembly, the arm 12 to which the anchor 30 is attached is raised from the ground and the slotted ends of the arms 12 are hooked on eccentric pins or bolts 31 and the arms pivoted by the pins 31 until the lugs 30a rest against the back of the aligning slots 12b; that is, the complementary lugs 30a and slots 12b are loosely fitting to facilitate ready engagement during assembly.

While in practice the operating mechanism 11 is preferably assembled with the supporting standard after the standard per se is completely assembled, for the sake of continuity its assembly will be described at this point. The operating mechanism 11 is provided with a plurality of radially projecting lugs 11a, each provided with a plurality of captive bolts 11b and formed with an aligning slot 11c in its under face (Fig. 11). The inner end of each of the arms 12 is contoured so that together they form a cradle for receiving and supporting the driving mechanism 11. The upper face of the inner end of each of the arms 12 is provided with a plurality of tapped holes 12d for receiving the captive bolts 11b and is also provided with an upstanding aligning pin 12e disposed to engage the complementary aligning slot in the under face of one of the projecting lugs 11a of the mechanism 11. The mechanism 11, shown in more detail in Fig. 11, is provided with a pair of carrying handles 11d by means of which it may be transported, lifted and placed in the cradle formed by the arms 12, the pins 12e registering with the slots 11c accurately to position the mechanism. The eccentric pins or bolts 31 are then rotatably adjusted accurately to position the arms 12 and the mechanism 11, that is, until the tapped holes 12d are in alignment with the captive bolts 11b, whereupon these bolts are tightened to secure the mechanism to the inner ends of the arms 12 in a precisely predetermined position and to form a rigid unitary structure.

Referring to Figs. 4, 5 and 5a, each of the supporting arms 12 includes a pair of disengageable abutting sections or arm members 12f and 12g which are preferably assembled immediately after assembly of the inner sections thereof to the anchor member as described above. Each of the sections 12f, 12g may be of any suitable truss or girder construction. They are adapted to be detachably secured together by means of an adjustable joint of the same general type as utilized for securing the arms 12 to the anchor member 30. This joint comprises complementary engaging elements, for example, a hinge joint comprising alignable apertures 12h and 12i at the bottoms of the abutting portions of the arms 12f, 12g, respectively, and a removable hinge pin 12j. The camming means comprises a pair of extension arms 12k secured to the abutting end of the section 12f and a camming pin 12m eccentrically mounted in the upper end of the arm section 12g and disposed to register with slots 12n in the extensions 12k. In assembly, the outer section 12g is relatively tilted in a counter-clockwise direction and the pin 12m dropped in the slots 12n, thereupon the sections 12f and 12g are relatively rotated about the pin 12m as a pivot until the apertures 12h and 12i are in alignment, whereupon the removable hinge pin 12j is inserted. The construction of the hinge components 12h, 12i, 12j is sufficiently loose-fitting to facilitate their ready engagement in assembly, whereupon the eccentric camming pin 12m is pivotally adjusted to draw the sections 12f and 12g into a tight abutting relation, as represented in the movement of the elements from the full-line position to the dotted-line position in Fig. 5a. The parts may be firmly secured in their final relation by means of a lock nut on camming pin or bolt 12m.

Figure 7A:
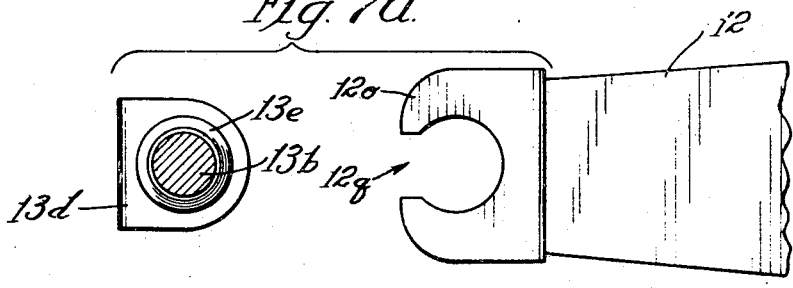
Figs. 7a and 7b are top and side detail views, respectively, of the engaging elements of the pedestal and the outer arm section of the support of Fig. 6.
Figure 7B:
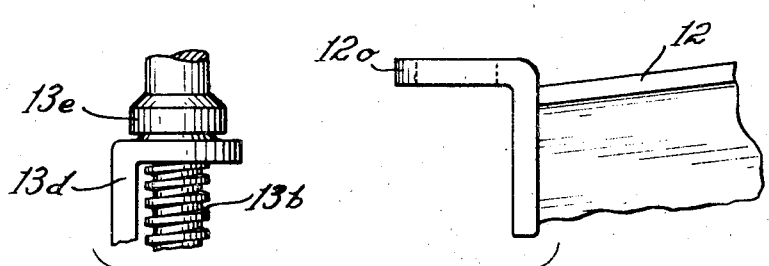

Referring to Figs. 6, 7a and 7b, the portable demountable standard also includes an adjustable pedestal 13 for each of the supporting arms comprising a base member 13a of substantial supporting area and an upwardly extending threaded supporting shaft 13b rotatably supported from the base member by means of a universal connection such as the ball and socket 13c. The pedestal also includes a cradle 13d threaded on the shaft and including vertically spaced supports positioned to engage similarly spaced supporting elements of the arm 12. For example, each of the supporting arms 12 has at its outer end a pair of vertically spaced apertured supporting lugs 12o and 12p while the cradle 13d includes a pair of vertically spaced collars 13e and 13f engaging the shaft 13b and positioned and proportioned to effect a locking engagement with the apertured lugs 12o and 12p respectively. As shown more clearly in Figs. 7a and 7b, the apertured lugs have a restricted opening 12g which is dimensioned to admit the threaded shaft 13b and then to slip down over the collars 13e and 13f, respectively, which are of larger diameters and prevent the horizontal disengagement of the lugs 12o, 12p and collars 13e, 13f, respectively.

The ball and socket connection 13c of the shaft 13b to the base member 13a not only permits rotation of the shaft 13b but constitutes a pivotal mounting, permitting alignment of the supporting elements or collars of the cradle 13d and the supporting elements or lugs 12o, 12p of the arm 12. In order to secure the parts together more firmly, there is provided a hold-down clamping means pivoted to the base member 13a for securing the shaft thereto and comprising a pair of links 13g engaging eyes 13h in the base 13a, and a yoke 13i engaging a shoulder on the shaft 13b, the parts being tightened by means of wing nuts 13j threaded on the links 13g.

The upper end of the shaft 13b is squared or otherwise formed to engage a wrench for rotatably adjusting it to raise and lower the threaded cradle 13d and thus to raise and lower the outer end of the associated arm 12. By adjustment of the several pedestals 13, Fig. 1, the supporting standard may be leveled with the aid of a spirit bubble level 11e (Fig. 11). The pedestal also includes means for locking the cradle 13 against rotation during rotatable adjustment of the shaft 13b, as described, this means being in the form of a spring-biased latch 13k engaging a notch in the side of the lug 12p.

During assembly, the cradle 13d is turned so that it is approximately midway between the two links 13g, the outer end of the arm 12 is lifted so that the apertures in the lugs 12o, 12p engage the shaft 13b and slide down over the collars 13e and 13f. With the weight taken off the pedestal by lifting the end of the arm 12, the cradle 13d is rotated until the latch 13k snaps in the slot in the side of the lug 12p.

After similarly installing the several pedestals 13, the shaft 13b of each is adjusted to level the supporting standard, as described. Thereupon, link tie rods 24 are installed interconnecting intermediate points of the arms 12, Figs. 1 and 8. At this point, the preassembled unitary driving mechanism 11 is installed, as described above, whereupon the captive bolts 11b of the operating mechanism are tightened. One of the links 24 is provided with an adjustable turnbuckle 24a which is then adjusted to take up any slack in the links and increase the rigidity of the structure. Still referring to Fig. 8, the supporting standard also includes a plurality of upwardly extending braces detachably individually secured to points on the arms 12 remote from their inner ends and a junction means for securing the braces together at their upper ends and comprising a bearing for the vertical shaft 10. Specifically, these braces are in the form of a tripod assembly including three upwardly extending braces 14, each detachably secured to an intermediate point of one of the arms 12, preferably at the junction of the two sections of each of the arms, by a hinge connection comprising an apertured lug 12r formed as an extension of the inner section of each of the arms 12, and a forked extension 14a on the lower end of each of the braces 14, together with a hinge pin 14b, Fig. 9. The tripod assembly also includes a collar 15 including provisions for securing the upper ends of the braces together, which may be pivotal connections 14c between the braces 14 and the collar 15. The collar is provided with a split bearing, Fig. 10, comprising a pivoted segment 15b adapted to open to admit the shaft 10 and to be engaged by a swing bolt 15c to lock the split bearing and supporting the shaft 10 in position.

Figure 12:
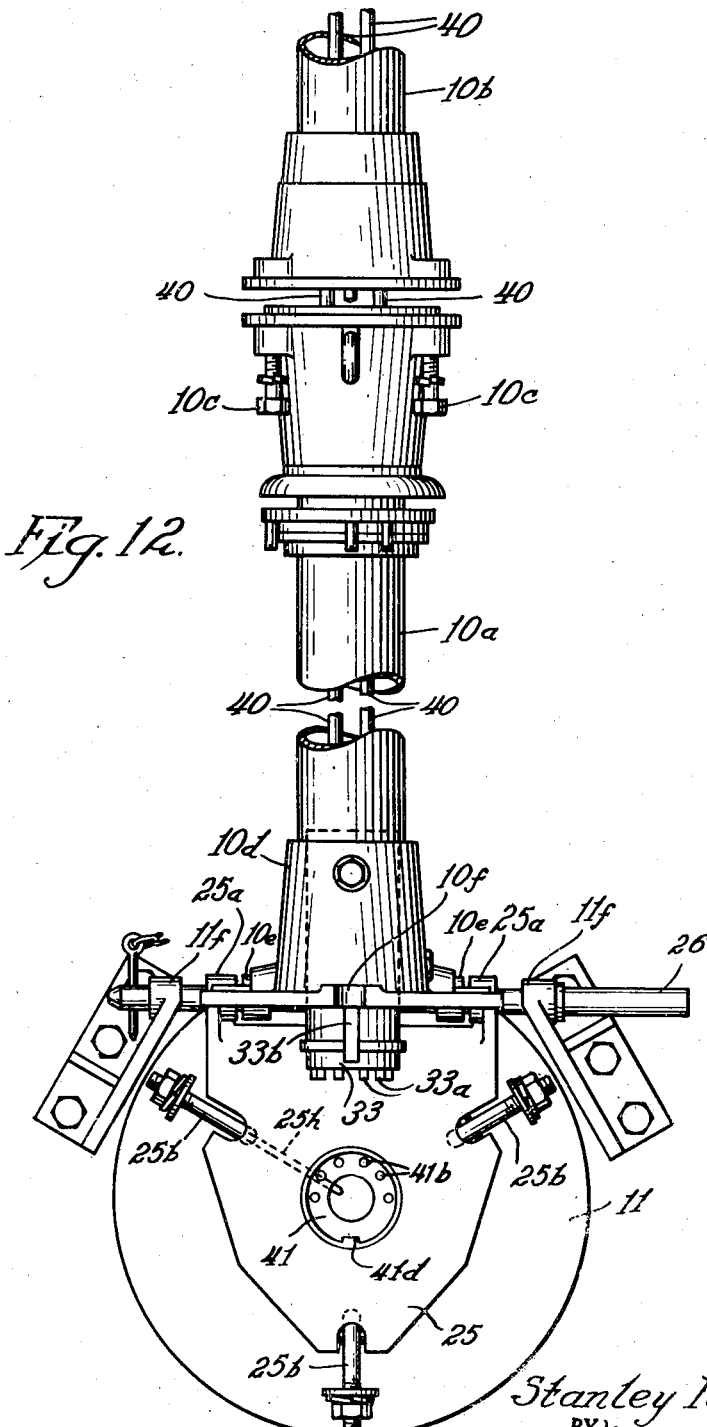
Fig. 12 is a top view of the vertical shaft during its assembly to the driving unit.

Usually it will be found preferable to construct the rotatable vertical mast 10 in two flanged sections 10a, 10b (Fig. 12) secured together by captive bolts 10c. To aid in assembling the mast to the supporting standard, there is provided a fulcrum joint for engaging and positioning the inner section 10a of the shaft 10, as indicated in Fig. 12. To this end, the section 10a is provided with a member such as a flanged sleeve 10d secured to the shaft. There is mounted in the casing 11 a member such as a flanged spindle 25 (Figs. 12 and 13) rotatable about a vertical axis for supporting and rotating the shaft 10. Complementary hinge elements are formed on the casing 11, the flanges of the spindle 25 and the sleeve 10d of the shaft 10. Specifically, the casing 11 is provided with upstanding apertured lugs 11f, while the spindle 25 is provided with apertured upstanding lugs 25a and the sleeve 10d is provided with apertured lugs 10e. In assembly, these various hinge apertures are lined up and a removable hinge pin 26 is inserted therethrough to serve as a fulcrum. Thereupon, the upper shaft section 10b is secured to the section 10a and an electrical apparatus at the upper end of the shaft 10, such as the antenna 21, Fig. 1, is also assembled. Thereupon the hoist line 19 and block and tackle 20 are attached, the hoist line 19 passing over the pulley 15a of collar 15 to raise the shaft 10 to its vertical position. During this operation, the removable hinge pin 26 and associated hinge apertures serve as a fulcrum about which the shaft 10 can be swung from the horizontal position to the vertical position and serve also to align the spindle 25 and the shaft sleeve 10d during assembly.

The mechanism also includes means independent of the fulcrum or hinge elements for securing the shaft sleeve 10d and the spindle 25 together with the shaft 10 in a vertical position. To this end, the flange of the sleeve 10d is provided with a plurality of peripheral apertures or notches 10f while the spindle 25 is provided with a similar number of swing bolts 25b disposed to engage the notches 10f of the sleeve 10d and secure the spindle and the sleeve together. In assembly, the swing bolts are moved into place and finger-tightened, whereupon the hinge pin 26 is removed and the swing bolts 25b fully tightened to secure the parts rigidly together. Thereupon, the pivoted bearing segment 15b, Fig. 10, of the collar 15 is closed and secured by the swing bolt 15c to retain the shaft 10 and provide a supporting bearing therefor at a substantial distance from the base of the shaft.

Figure 13:
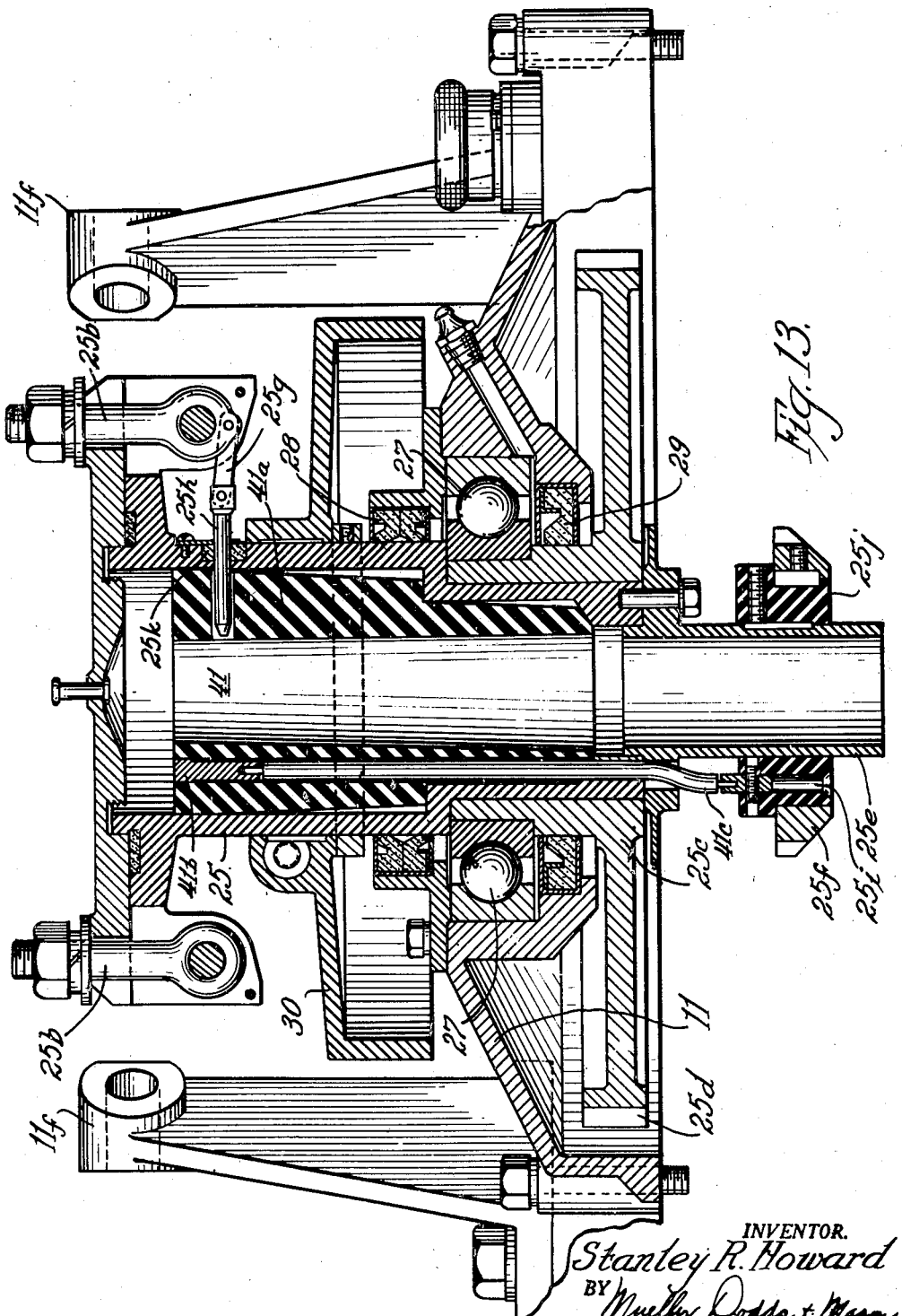
Fig. 13 is a cross sectional detail of the construction of the bearing and rotatable support for the vertical shaft in the drive unit.

In Fig. 13 there are illustrated the details of the mounting of the rotatable spindle 25 in the casing of the operating mechanism 11. Secured to the inner end of the spindle 25 is a hub 25c on which is formed a spur gear 25d for rotating the spindle and shaft assembly. Also secured to the spindle 25 is an inwardly projecting flanged sleeve 25e on which is supported a bevelled-edge spur gear 25f, the relation of the gears 25d and 25f to the remaining portion of the apparatus being described hereinafter. The gear 25f is formed with an insert 25j of insulation material such as "Bakelite" in which are disposed a plurality of socket contact elements 25i to form a rotary socket connector. The spindle assembly 25 is supported from the casing mechanism 11 by means of a ball bearing 27, above and below which are mounted seals 28 and 29, while the bearings and seals are protected against the elements by means of a cap 30 disposed above them and surrounding and secured to the spindle 25.

Referring now to Figs. 14, 15a and 15b, there are illustrated the details of the preassembled portable driving, shaft supporting, and control unit embodying certain features of the invention. This unit comprises the casing 11 proportioned to fit within the cradle formed by the inner ends of the supporting arms 12, as illustrated particularly in Fig. 3 and described above. For convenience in assembling, the casing 11 is horizontally divided into three sections 11g, 11h and 11i, the upper section 11g supporting the flanged spindle 25 which, in turn, supports and drives the vertical shaft 10, as previously described. Secured to and forming a unitary part of the casing 11 is a driving motor 31 having a vertical drive shaft on which is mounted a pinion 31a which upon assembly of the various sections 11g, 11h and 11i of the casing is disposed to engage the spur gear 25d attached to the spindle 25 for rotating the vertical shaft 10.

Also mounted within the casing 11 is a dynamo-electric machine, specifically a self-synchronous transmitter 32, including a shaft rotatable about a vertical axis, such shaft having a driving connection for engaging the vertical shaft 10, preferably including the rotatable supporting spindle 25. This driving connection includes a bevelled edge spur gear 32a mounted on the shaft of the machine and disposed, upon assembly of the unit, to engage the gear 25f secured to the extension 25e of supporting spindle 25. The machine 32 is pivoted or otherwise mounted for limited pivotal motion about a horizontal axis near the base of the machine and there is provided means for biasing the machine about such pivotal axis to effect positive engagement of its driving connection with the vertical shaft 10, irrespective of limited deflection of the vertical shaft due to external transverse forces, such as wind loading, operating on the antenna 21. To this end, the machine 32 is provided with lugs 32b which are pivoted in the upper ends of pins or supports 11j upstanding from the bottom of the casing section 11i, the axes of the pivots 32b being coaxial. The machine 32 is also provided with a mounting bolt 32c remote from the axis of the pivots 32b on which is threaded a helical biasing spring 32d normally under compression so as to bias or urge the machine 32 for pivotal movement about the axis of the pivots 32b and to bias its gear 32a into engagement with the associated gear 25f of the drive shaft 10. The bevelled edges of gears 25f and 32a facilitate their engagement during assembly of the mechanism.

As previously described, the apparatus is designed to carry an electrical apparatus such as the directional antenna array 21, Fig. 1, at the upper end of the shaft 10 and the circuit connections for such apparatus are carried by the shaft, that is, they extend through the shaft and terminate in a connector 33, Fig. 12, at its lower end. In order to supply the desired power to the antenna 10 via the connector 33, there is mounted in the lower section 11i of the casing a rotary connector 34 including one fixed portion and one portion rotatably supported from the casing. For example, the fixed portion comprises terminal posts 34a, 34a including a plurality of terminals and between which are supported a plurality of pairs of brushes or collectors 34b, each pair being engaged by a band 34c tensioned by a spring 34g. The rotary connector also includes a portion 34d suitably rotatably supported from the bottom casing 11i and provided with a plurality of slip rings 34e registering with the brushes 34b. The member 34d also includes a plurality of upwardly extending contact pins 34f comprising a rotary connector complementary to the socket connector 25j, 25i mounted at the lower end of the spindle 25. Disposed within the spindle 25 is an auxiliary rotary connector 41 (Figs. 12, 13 and 17) comprising a cylindrical body portion 41a of insulation material, such as molded "Bakelite," in which are inserted a plurality of contact elements 41b connected by conductors 41c extending through apertures in the body 41 with the socket contact elements 25i in the connector 25i, 25j. It is noted that the contact elements 41b of connector 41 are flush with the upper face thereof. On the other hand the pins 33a of connector 33 are spring-pressed contact elements for making an abutting contact with the contact elements 41b, thus allowing for minor angular misalignment while maintaining the desired circuit connections. The connector 41 is also provided with a keyway 41d adapted to be engaged by a key 33b (Fig. 12) to ensure accurate registration between the contacts of the two rotary connector elements 41 and 33. Thus, with the mast 10 assembled in its upright position, the electrical circuits to the antenna array 21 are completed from the rotary plug connector 34 through the rotary socket connector 25i, 25j, the conductors 41c, and the rotary connectors 41 and 33.

There is also included within the lower casing 11i a control-circuit terminal board 35 including terminals for the electrical apparatus at the upper end of the shaft 10 via the rotary connector 33, 34 and terminals for the dynamo-electric machine 32 and motor 31. The connections from the terminals of terminal board 35 to the motor 31 include a switch 36. The several terminals of the terminal board 35 are also connected to an electrical connector 37 (Fig. 14) of either the plug or socket type accessible externally of the casing but normally closed by a cap 37a (Fig. 15a) to protect the electrical contacts.

A simplified circuit diagram of the electrical apparatus and the control unit within the casing 11 is represented by Fig. 16, in which elements corresponding to those of Figs. 14, 15a and 15b are identified by the same reference numerals to aid in identification.

In Fig. 17 is represented a rigid coaxial connector 38 having an elbow section 38a for making connection from an external coaxial cable 39, Fig. 1, to the conductors 40 (Fig. 12) extending through the hollow vertical shaft 10. The connector 38 is secured to the extension 45 on the underside of the lower casing section 11i by suitably threaded connectors and extends upwardly through the rotary connector 34 and through the spindle 25 into the connector 33 disposed in the lower end of the sleeve 10d attached to the lower end of the shaft 10. Extension 45 is normally closed by a cap 45a to protect the interior of the casing section 11i and this cap must be removed to make the above-referred to connection. The connector 33, in addition to the contact elements 33a cooperating with connector 41, includes a rotary connector (not shown) cooperating with a stationary connector at the end of the connector 38 to form therewith a rotary electrical coupling.

One of the swing bolts 25b for securing the flanged sleeve 10d to the flanged supporting spindle 25 includes a pivoted link 25g pivotally connected to a pin 25h extending through an aperture 25k in the side of the spindle 25. These elements are so proportioned that the coaxial connector 38 cannot be inserted to register with a complementary element in the sleeve 10b unless the swing bolts 25b are in positions corresponding to the locking of the shaft sleeve 10d to the spindle 25. Conversely, the swing bolt 25b cannot be withdrawn to release the shaft sleeve 10d until the rigid coaxial connector 38 has been withdrawn, thus preventing injury to the coaxial connector by an attempt to disassemble the vertical shaft before removal of the coaxial connector 38.

Thus it is seen from the foregoing description that there is provided by the invention a portable demountable power-driven mechanism and a portable demountable standard therefor which can be readily assembled and disassembled for movement from place to place. At the same time, the mechanism can be assembled and disassembled by relatively unskilled labor and with the use of a minimum number of special tools and assembly jigs, while the resulting mechanism, when assembled, is of rigid construction but involves a precise cooperation of the several elements to permit an accurate control of the mechanism from a local or remote controlling station.

While there has been described what is at present considered to be the preferred embodiment of the invention, it will be apparent to those skilled in the art that various changes and modifications may be made therein without departing from the spirit and scope of the invention.

I claim:

1. A portable demountable supporting standard for a mechanism including an extended vertical rotatable shaft comprising, a plurality of radially extending supporting arms, junction means for detachably securing said arms together at their inner ends, a plurality of upwardly extending braces detachably individually secured to points on said arms remote from their inner ends, and junction means for securing said braces together at their upper ends and comprising a bearing for the vertical shaft.

2. A portable demountable supporting standard for a mechanism including an extended vertical rotatable shaft comprising, a plurality of radially extending supporting arms, each of said arms including a pair of disengageable sections, junction means for detachably securing said arms together at their inner ends, a plurality of upwardly extending braces detachably individually secured to the junctions of said arm sections, and junction means for securing said braces together at their upper ends and comprising a bearing for the vertical shaft.

3. A portable demountable supporting standard for a mechanism including an extended vertical rotatable shaft comprising, a plurality of radially extending supporting arms, junction means for detachably securing said arms together at their inner ends, a plurality of upwardly extending braces detachably individually secured to points on said arms remote from their inner ends, and a collar including provisions for securing said braces together at their upper ends and including also a split bearing for receiving and supporting the vertical shaft.

4. A portable demountable supporting standard for a mechanism including an extended vertical rotatable shaft comprising, three radially extending supporting arms, junction means for detachably securing said arms together at their inner ends, and a tripod assembly including three upwardly extending braces each detachably secured to a point on one of said arms remote from its inner end and a collar pivotally engaging the upper ends of said braces and provided with a split bearing for receiving and supporting the vertical shaft.

5. A portable demountable mechanism comprising, an extended vertical rotatable shaft, a unitary driving means for said shaft, a supporting standard including a plurality of radially extending supporting arms, junction means for detachably securing said arms together at their inner ends, the inner ends of said arms being contoured to form a cradle for receiving and supporting said driving means, a plurality of upwardly extending braces detachably individually secured to points on said arms remote from their inner ends, and junction means for detachably securing said braces together at their upper ends and comprising a bearing for said vertical shaft.

6. In a portable demountable supporting standard including a plurality of radially extending supporting arms each including at its outer end a plurality of vertically spaced supporting elements, an adjustable pedestal for each of said arms comprising, a base member of substantial supporting area, an upwardly extending threaded supporting shaft rotatably supported from said member, and a cradle threaded on said shaft and including vertically spaced supports positioned to engage the supporting elements of a supporting arm, said shaft being pivotally mounted on said member to permit alignment of said supports of said cradle and the supporting elements of said arm.

7. In a portable demountable supporting standard including a plurality of radially extending supporting arms each including at its outer end a plurality of vertically spaced supporting elements, an adjustable pedestal for each of said arms comprising, a base member of substantial supporting area, an upwardly extending threaded supporting shaft, a ball and socket connection for supporting said shaft from said base member, and a cradle threaded on said shaft and including vertically spaced supports positioned to engage the supporting elements of a supporting arm, said shaft connection to said base member permitting alignment of said supports of said cradle and the supporting elements of said arm.

8. In a portable demountable supporting standard including a plurality of radially extending supporting arms each including at its outer end a plurality of vertically spaced supporting elements, an adjustable pedestal for each of said arms comprising, a base member of substantial supporting area, an upwardly extending threaded supporting shaft rotatably supported from said member, hold-down clamping means pivoted to said base member for securing said shaft thereto, and a cradle threaded on said shaft and including vertically spaced supports positioned to engage the supporting elements of a supporting arm, said shaft being pivotally mounted on said member to permit alignment of said supports of said cradle and the supporting elements of said arm.

9. In a portable demountable supporting standard including a plurality of radially extending supporting arms each including at its outer end a plurality of vertically spaced apertured supporting lugs, an adjustable pedestal for each of said arms comprising, a base member of substantial supporting area, an upwardly extending threaded supporting shaft rotatably supported from said member, and a cradle threaded on said shaft and including vertically spaced collars engaging said shaft and positioned to engage the apertured supporting lugs of a supporting arm, said shaft being pivotally mounted on said member to permit alignment of said supports of said cradle and the supporting elements of said arm.

10. In a portable demountable supporting standard including a plurality of radially extending supporting arms each including at its outer end a plurality of vertically spaced apertured supporting lugs, an adjustable pedestal for each of said arms comprising, a base member of substantial supporting area, an upwardly extending threaded supporting shaft rotatably supported from said member, and a cradle threaded on said shaft and including vertically spaced collars engaging said shaft and positioned and proportioned to effect a locking engagement with the apertured supporting lugs of a supporting arm, said shaft being pivotally mounted on said member to permit alignment of said supports of said cradle and the supporting elements of said arm.

11. In a portable demountable supporting standard including a plurality of radially extending supporting arms each including at its outer end a plurality of vertically spaced supporting elements, an adjustable pedestal for each of said arms comprising, a base member of substantial supporting area, an upwardly extending threaded supporting shaft rotatably supported from said member, a cradle threaded on said shaft and including vertically spaced supports positioned to engage the supporting elements of a supporting arm, said shaft being pivotally mounted on said member to permit alignment of said supports of said cradle and the supporting elements of said arm, and means for locking said cradle against rotation upon rotational adjustment of said shaft.

12. In a portable demountable supporting standard including a plurality of radially extending supporting arms each including at its outer end a plurality of vertically spaced supporting elements, an adjustable pedestal for each of said arms comprising, a base member of substantial supporting area, an upwardly extending threaded supporting shaft rotatably supported from said member, a cradle threaded on said shaft and including vertically spaced supports positioned to engage the supporting elements of a supporting arm, said shaft being pivotally mounted on said member to permit alignment of said supports of said cradle and the supporting elements of said arm, and a latch for locking said cradle to said supporting arm to prevent rotation of said cradle upon rotational adjustment of shaft.

13. A portable demountable supporting standard including a plurality of radially-extending supporting arms, a central anchor member, an adjustable joint for securing each of a plurality of said arms to said anchor member comprising, a lug extending radially from said anchor member, a complementary aligning slot in said arm, said lug and slot being sufficiently loose-fitting to facilitate ready engagement in assembly, a pin eccentrically pivoted on said anchor member substantially normal to said lug, and a complementary aperture formed in said arm and adapted to engage said pin, pivotal adjustment of said pin being effective to position said arm and said member accurately relative to each other.

14. A portable demountable supporting standard for a unitary operating mechanism including a plurality of radially-extending supporting arms, a central anchor member, an adjustable joint for securing each of a plurality of said arms to said anchor member comprising, a lug extending radially from said anchor member, a complementary aligning slot in said arm, said lug and slot being sufficiently loose-fitting to facilitate ready engagement in assembly, and a pin eccentrically pivoted on said anchor member substantially normal to said lug, and a complementary aperture formed in said arm and adapted to engage said pin, the inner ends of said arms being contoured to form a supporting cradle for said mechanism, means for securing said arms to said mechanism in a precisely predetermined position, pivotal adjustment of said pin being effective to position said arm and said member accurately relative to each other to align said securing means.

15. In a portable demountable supporting standard for a mechanism including a vertical rotatable shaft, a fulcrum joint comprising, a member adapted to be supported from the standard and including means for rotating said shaft, a member secured to said shaft, complementary hinge elements formed on said members, a removable hinge pin for said elements serving as a fulcrum about which said shaft may be swung from a horizontal position to a vertical position, and means independent of said hinge elements for securing said members together with said shaft in a vertical position.

16. In a portable demountable supporting standard for a mechanism including a vertical rotatable shaft, a fulcrum joint comprising, a flanged spindle mounted on said standard and rotatable about a vertical axis, a member secured to said shaft, complementary hinge elements formed on the flange of said spindle and on said member, a removable hinge pin for said elements serving as a fulcrum about which said shaft may be swung from a horizontal position to a vertical position, and means independent of said hinge elements for securing said spindle and said member together with said shaft in a vertical position.

17. In a portable demountable supporting standard for a mechanism including a vertical rotatable shaft, a fulcrum joint comprising, a casing mounted on said standard and including driving means for said shaft, a flanged spindle mounted in said casing and rotatable about a vertical axis by said driving means, a member secured to said shaft, complementary hinge elements formed on said casing, the flange of said spindle and said member, a removable hinge pin for said elements serving as a fulcrum about which said shaft may be swung from a horizontal position to a vertical position, and means independent of said hinge elements for securing said spindle and said member together with said shaft in a vertical position.

18. In a portable demountable supporting standard for a mechanism including a vertical rotatable shaft, a fulcrum joint comprising, a member adapted to be supported from the standard and including means for rotating said shaft, a member secured to said shaft, complementary hinge elements formed on said members, a removable hinge pin for said elements serving as a fulcrum about which said shaft may be swung from a horizontal position to a vertical position, one of said members including a plurality of apertures, and a plurality of swing bolts attached to the other of said members and disposed to engage said apertures for securing said members together with said shaft in a vertical position.

19. In a portable demountable supporting standard for a mechanism including a vertical rotatable shaft, a fulcrum joint comprising, a casing mounted on said standard and including driving means for said shaft, a flanged spindle mounted in said casing and rotatable about a vertical axis by said driving means, a flanged sleeve secured to said shaft, complementary hinge elements formed on said casing and on the flanges of said spindle and said sleeve, a removable hinge pin for said elements serving as a fulcrum about which said shaft may be swung from a horizontal position to a vertical position, the flange of said sleeve being provided with a plurality of peripheral slots, and a plurality of swing bolts attached to the flange of said spindle and disposed to engage said slots for securing said spindle and said sleeve together with said shaft in a vertical position.

20. A portable demountable mechanism comprising, a supporting standard, an extended vertical rotatable shaft, a member secured to said shaft, a preassembled portable driving unit for said shaft comprising a casing for detachably engaging said standard, complementary hinge elements secured to said member and said casing, a removable hinge pin for said hinge elements serving as a fulcrum about which said shaft may be swung from a horizontal position to a vertical position during assembly of the mechanism, and means independent of said hinge elements for securing said shaft in a vertical position.

21. A portable demountable mechanism comprising, a supporting standard, an extended vertical rotatable shaft, a member secured to said shaft, a preassembled portable driving unit for said shaft comprising a casing for detachably engaging said standard, a flanged spindle for supporting said shaft mounted in said casing and rotatable about a vertical axis, complementry hinge elements secured to said member, said spindle flange, and said casing, a removable hinge pin for said hinge elements serving as a fulcrum about which said shaft may be swung from a horizontal position to a vertical position and serving also to align said shaft and said spindle during assembly of the mechanism, and means independent of said hinge elements for securing said shaft in a vertical position.

STANLEY R. HOWARD.

REFERENCES CITED

The following references are of record in the file of this patent:

UNITED STATES PATENTS

| Number | Name | Date |
|---|---|---|
| 805,707 | Brown | Nov. 28, 1905 |
| 1,006,427 | Boraks | Oct. 27, 1911 |
| 1,086,619 | Rinebold | Feb. 10, 1914 |
| 1,242,204 | Kimble | Oct. 9, 1917 |
| 1,785,343 | Gilbert | Dec. 16, 1930 |
| 1,849,898 | Wright | Mar. 15, 1932 |
| 1,864,304 | Hoe | June 21, 1932 |
| 2,028,282 | Hoe | Jan. 21, 1936 |
| 2,042,443 | Buckstone | May 26, 1936 |
| 2,218,583 | Marthaler | Oct. 22, 1940 |
| 2,238,708 | Russal | Apr. 15, 1941 |
| 2,248,335 | Burkhart | July 8, 1941 |
| 2,268,640 | Brown | Jan. 6, 1942 |
| 2,282,393 | Block | May 12, 1942 |
| 2,283,324 | Faber | May 19, 1942 |
| 2,303,978 | Biberman | Dec. 1, 1942 |